(12) United States Patent
Kehrer

(10) Patent No.: US 9,886,407 B2
(45) Date of Patent: Feb. 6, 2018

(54) CONNECTIVITY OF SLAVE DEVICES IN MOBILE DEVICES

(71) Applicant: Infineon Technologies AG, Neubiberg (DE)

(72) Inventor: Daniel Kehrer, Sauerlach (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 618 days.

(21) Appl. No.: 14/213,173

(22) Filed: Mar. 14, 2014

(65) Prior Publication Data

US 2015/0261708 A1 Sep. 17, 2015

(51) Int. Cl.
| G06F 13/40 | (2006.01) |
| G06F 13/38 | (2006.01) |
| H04B 1/00  | (2006.01) |

(52) U.S. Cl.
CPC .......... *G06F 13/4022* (2013.01); *H04B 1/005* (2013.01)

(58) Field of Classification Search
None
See application file for complete search history.

(56) References Cited

U.S. PATENT DOCUMENTS

| 2009/0002212 A1* | 1/2009 | De Ceuninck | H03M 1/1047 341/145 |
| 2012/0091799 A1* | 4/2012 | Rofougaran | H02J 1/10 307/24 |
| 2013/0107763 A1* | 5/2013 | Uyehara | H04B 7/024 370/278 |
| 2013/0108068 A1* | 5/2013 | Poulsen | H04R 5/033 381/74 |
| 2013/0198427 A1 | 8/2013 | Leitner et al. | |
| 2013/0242800 A1 | 9/2013 | Gruber et al. | |
| 2013/0294554 A1 | 11/2013 | Kadam et al. | |

FOREIGN PATENT DOCUMENTS

| CN | 101572558 A | 11/2009 |
| CN | 103226536 A | 7/2013 |

OTHER PUBLICATIONS

Mipi alliance, Specification Overview, "Specification for RF Front-End Control Interface," May 3, 2010, 2 pages, Version 1.00.00.
Wietfeldt, R., et al., "Mobile Platform Architectures using MIPI Standards," Next Generation Mobile Device Platform Architectures IWPC Workshop, San Jose, CA, Jun. 20-22, 2011, 18 pages.
Wilkerson, V., et al., "Unification in the RF front-end : the new MIPI standard," Nov. 8, 2010, 7 pages.
Bingyin, Shi, et al., "IP Design and Implementation of RFFE Bus," Microcontrollers & Embedded Systems, Dec. 2013, 4 pages.

* cited by examiner

*Primary Examiner* — Scott Sun
(74) *Attorney, Agent, or Firm* — Slater Matsil, LLP

(57) ABSTRACT

In accordance with an embodiment of the present invention, a chip set for a mobile device includes a slave device chip and an interface circuit chip that includes a slave bus interface for controlling the slave device chip through an analog bus. The slave bus interface is coupled to a master bus interface via a digital bus of the mobile device. The slave bus interface is configured to be driven by the master bus interface.

28 Claims, 9 Drawing Sheets

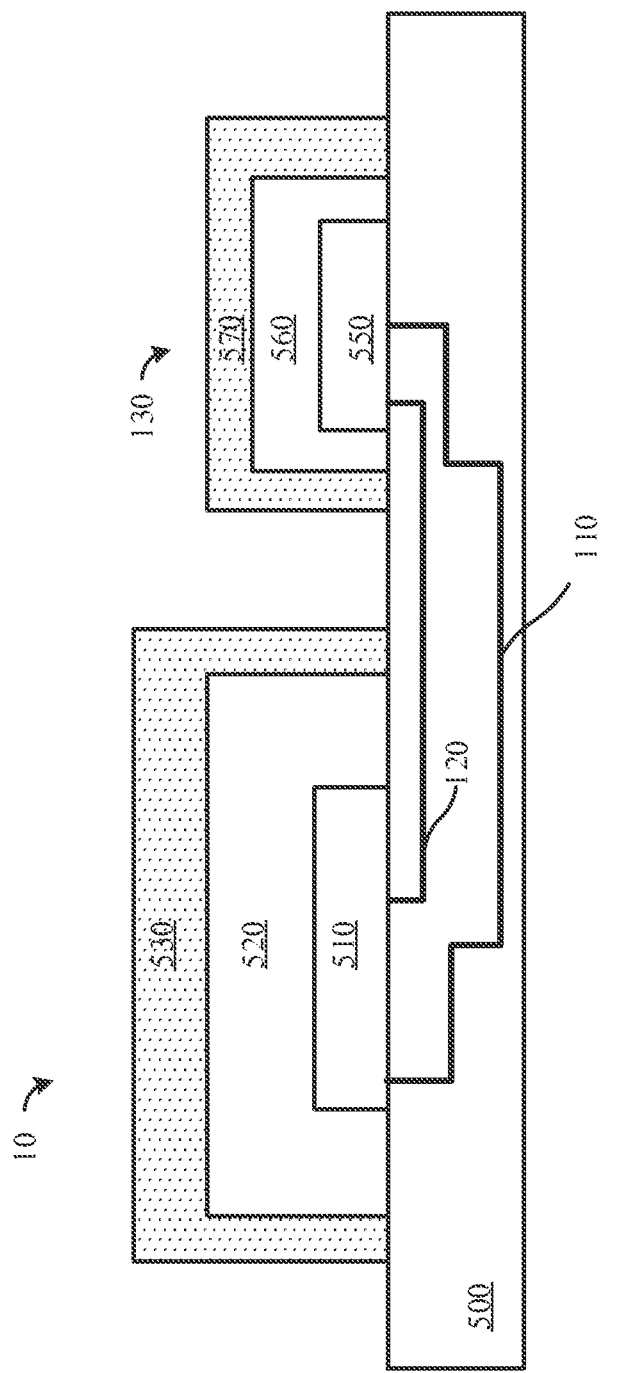

CONNECTIVITY OF SLAVE DEVICES IN MOBILE DEVICES

TECHNICAL FIELD

The present invention relates generally to semiconductor devices, and, in particular embodiments, to connectivity of slave devices in mobile devices.

BACKGROUND

Electronic devices used with wireless communication systems, such as cellular phones, GPS receivers, and Wi-Fi enabled notebook and tablet computers, generally contain signal processing systems that have interfaces to the analog world. Such interfaces may include wire line and wireless receivers that receive transmitted power and convert the received power to an analog or digital signal that may be demodulated using analog or digital signal processing techniques.

In addition to having a radio frequency (RF) transceiver, many modern mobile communication platforms also use further front end components such as power amplifiers, active antenna tuners, low noise amplifiers, and antenna switches. Moreover, in multiple antenna systems, such as multiple input multiple output (MIMO) systems, and multiple protocol systems, the RF system may have a multitude of various selectable and configurable components that support each particular signal path and/or protocol. Many of these multiple radio frequency components are controllable by a digital bus in order to provide control and configuration in various operational modes.

One such digital interface bus is based on a standardized protocol developed by the MIPI Alliance called the radio frequency front-end (RFFE) control interface described in the "MIPI® Alliance Specification for RF Front-End Control Interface," version 1.10-26 Jul. 2011, which is incorporated herein by reference in its entirety. The MIPI RFFE control interface bus contains its own power supply voltage, and data is transmitted via a CLK line and a DATA line. Each RFFE slave device coupled to the MIPI RFFE bus is identifiable via a slave identifier, a manufacturer identifier, and a product identifier. A relatively high clock frequency of 26 MHz is used to for the RFFE bus in order to facilitate timing-critical functionality across multiple devices.

SUMMARY OF THE INVENTION

In accordance with an embodiment of the present invention, a chip set for a mobile device comprises a slave device chip and an interface circuit chip comprising a slave bus interface for controlling the slave device chip through an analog bus. The slave bus interface is coupled to a master bus interface via a digital bus of the mobile device. The slave bus interface is configured to be driven by the master bus interface.

In accordance with an embodiment of the present invention, an interface circuit chip for a mobile device comprises a slave bus interface for controlling a slave device chip, and a digital input coupled to the slave bus interface. The digital input is configured to be coupled to a master bus interface via a digital bus of the mobile device. An analog output is coupled to the slave bus interface. The analog output is configured to be coupled to the slave device chip through an analog bus. The slave bus interface is configured to convert a digital control signal for controlling the slave device chip received at the digital input to an analog signal at the analog output.

In accordance with an embodiment of the present invention, a method of controlling a slave device chip in a mobile device comprises receiving a control signal intended for the slave device chip on a digital bus at an interface circuit chip. The interface circuit chip is different from the slave device chip. The method further includes converting the control signal to an analog signal comprising control information at the interface circuit chip. The analog signal comprising the control information is transmitted to the slave device chip.

BRIEF DESCRIPTION OF THE DRAWINGS

For a more complete understanding of the present invention, and the advantages thereof, reference is now made to the following descriptions taken in conjunction with the accompanying drawings, in which:

FIG. 3, which includes

FIG. 6, which includes FIG. 6A illustrates an embodiment of the mobile handset chipset while FIG. 6B illustrates a chip set; and FIG. 7, which includes FIGS. 7A and 7B, illustrates a structural embodiment of the LNA chipset used for mobile handset chipset in accordance with an embodiment of the present invention.

DETAILED DESCRIPTION OF ILLUSTRATIVE EMBODIMENTS

The present invention will be described with respect to exemplary embodiments in a specific context, namely a slave bus interface circuit for use in a radio frequency front-end (RFFE) control interface. Embodiments of the present invention may also be applied to bus interface circuits directed toward other applications.

Figure 1:
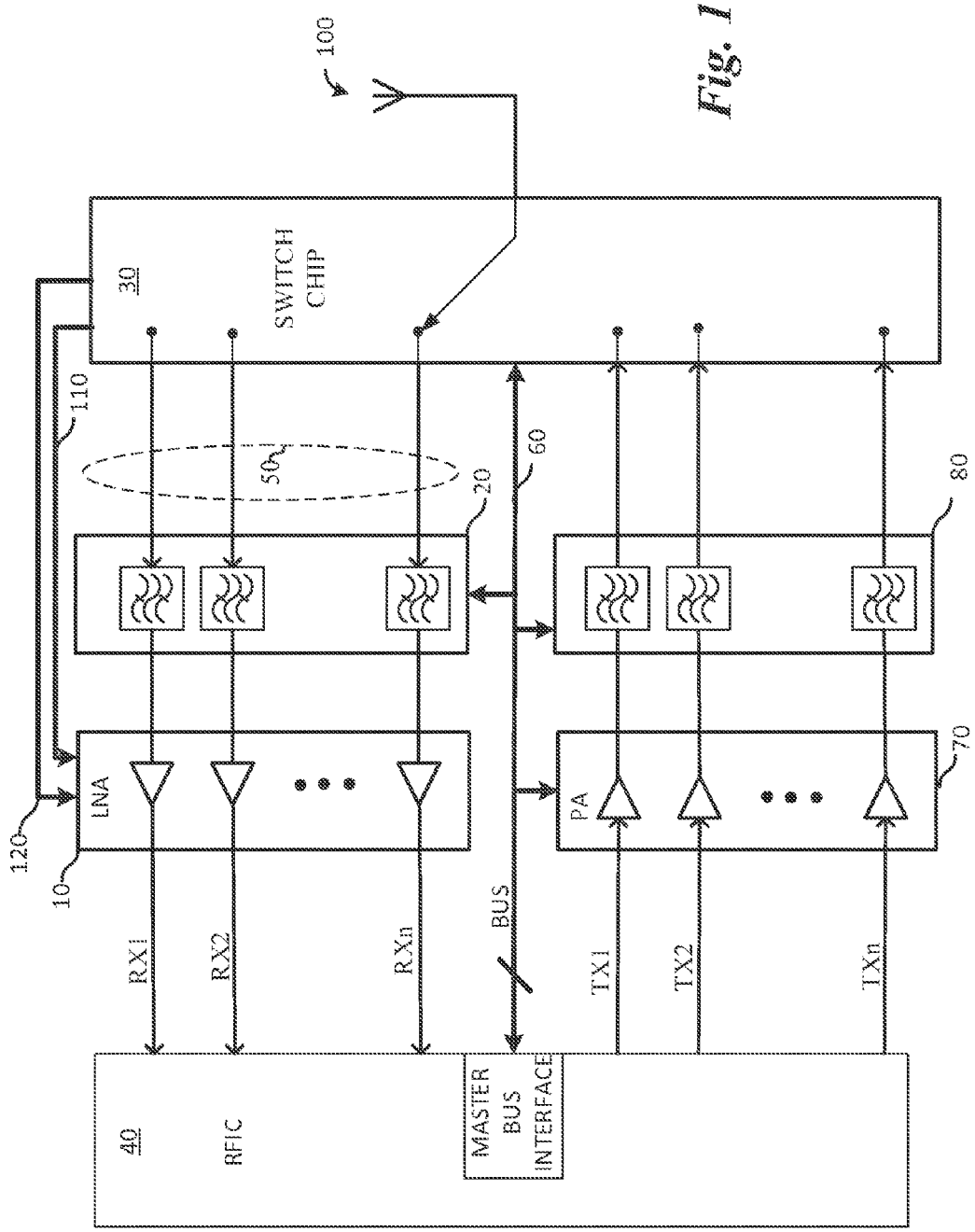
FIG. 1 illustrates a schematic block diagram of a mobile handset chipset in accordance with an embodiment of the present invention.

FIG. 1 illustrates a block diagram of RF system of a handset in accordance with an embodiment of the invention. FIG. 1 is a schematic of transmitter/receiver paths coupled through a single antenna for illustration purposes. Various implementations may include additional complexity, for example, added diversity, multiple input multiple output paths, and others.

The increasing demand in data rate for mobile handsets increases the number of bands operated within a single mobile handset. Carrier aggregation helps to combine different bands to accommodate the high data rate. However, the increasing number of bands increases the technical complexity of the RF front end modules. For example, the front end includes the antenna 100, antenna switch chip 30, filters such as filter bank 20, and a low noise amplifier chip 10.

The RF signal is received at the antenna 100 and is routed by a switch or a duplexer to the desired receive path. In one embodiment, the antenna switch chip 30 may select between multiple receive input paths RX1, RX2 . . . RXn and multiple transmit output paths TX1, TX2 . . . TXn.

The signal from the antenna 100 is filtered through a band filter bank 20, for example, comprising one or more bandpass filters or a plurality of bandpass filters. For example, each band may be filtered through a separate filter. The location of the filters relative to the low noise amplifier (LNA) chip 10 may be a design choice and may be varied. Additionally, more than one filter may be added to each receive path or transmit path.

Each of the receive input path is coupled through a LNA chip 10 so as to amplify the incoming signal. The LNA chip 10 may include one or more low noise amplifiers. The LNA chip 10 may include a plurality of low noise amplifiers. For example, each band may have a separate low noise amplifier. The LNA chip 10 amplifies the very small signals that may be received by the antenna, provides gain to these small signals and passes an amplified signal to later amplification and/or signal processing stages. By providing gain at the LNA, subsequent gain processing stages are made insensitive to noise, thereby enabling a lower system noise figure.

For example, receive input path RX1 may be coupled through a low noise amplifier (LNA) in the LNA chip 10 and a bandpass filter in the RX filter bank 20. Each of the low noise amplifiers in the LNA chip 10 has to be controlled differently, for example, with a different gain, current levels, and activation. This complicates the implementation of the interface circuits on the LNA products such as the LNA chip 10. Additionally, the interface circuits compatible with the MIPI interface add further constraints and complexity.

The output from the LNA chip 10 is received at a radio frequency integrated circuit (RFIC) 40. Similarly, the transmit paths proceeds through the RFIC 40 to power amplifiers, which amplify the signal to be transmitted. For example, a transmit output path TX1 is coupled to power amplifier in the PA chip 70 and a bandpass filter in the TX filter bank 80. In one or more embodiments, the PA chip 70 may include one or more power amplifiers or a plurality of power amplifiers. The RFIC 40 may include a transceiver chip or chipset to upconvert or downconvert the RF signal to baseband. The RFIC 40 may implement any one of the many standard radio frequency protocols such as Global System for Mobile Communications (GSM), Universal Mobile Telecommunications System (UMTS), Long Term Evolution (LTE), Code Division Multiple Access 2000 (CDMA2000), and Worldwide Interoperability for Microwave Access (WiMAX). The RFIC 40 may also be included with the mobile processor.

As illustrated in FIG. 1, the RFIC 40 may include a master bus interface to drive the slave devices on the bus 60. In various embodiments, the bus 60 may be a RFFE bus and may be a pure control interface that does not target the signal paths associated with the front-end devices being controlled. Each of the devices on the bus 60 may be a slave unit comprising slave interface bus to receive the signals on the bus 60. In one or more embodiments, the master bus interface implements a MIPI RF Front-End (RFFE) Control Interface protocol. The MIPI protocol uses two signal lines, a clock signal (SCLK) controlled by the master interface bus, a unidirectional/bidirectional data signal (SDATA), and an I/O supply/reference voltage (VIO).

In various embodiments, the LNA chip 10 is formed using SiGe or GaAs technology because of their better performance. However, logic circuits on SiGe or GaAs technology are expensive and take considerable area (relative to comparable silicon technology or bulk silicon CMOS technology). Another disadvantage is the high power consumption of such logic blocks in SiGe technologies. In contrast, silicon based technology do not have the low noise characteristics obtainable with SiGe or GaAs technologies. Thermal noise (also called Johnson noise or white noise) and shot noise (also called Schottky noise) is one of the main types of noise in low noise amplifier designs. The use of SiGe heterojunction bipolar transistors helps to reduce these sources of noise. Consequently, SiGe bipolar transistors exhibit high gain and low noise compared to silicon technology.

As described above, a system controlled by a digital bus interface such as from the master bus interface on the RFIC 40 requires adding slave bus interface on each of the slave devices such as the LNA chip 10. However, adding the RFFE slave bus interface on the LNA chip 10 increases the costs of the LNA because of the difficulty of adding logic circuits on SiGe or GaAs based technologies. Similarly, using silicon technology to build the LNA chip 10 lowers the performance of the LNA.

Embodiments of the invention overcome these issues by placing a slave bus interface on one of the devices built using silicon technology. Therefore, the cost of adding the slave bus interface on such a device such as the switch chip 30 is minimal. Further, the switch chip 30 may be coupled to the LNA chip 10 through the module or board using an analog bus. Thus, the LNA chip 10 can be built with minimal or no logic circuitry reducing the cost of the system.

The MIPI RFFE Specification defines an interface between RFFE-capable devices, with one master device and up to 15 slaves on a single RFFE bus. Thus, as illustrated in FIG. 1, the master bus interface on the RFIC 40 controls the RFFE-capable devices on the bus 60 such as the RX filter bank 20, the PA chip 70, the TX filter bank 80, and the switch chip 30 through the bus 60, which as described previously may be a MIPI compliant bus with a DATA line and a CLK line.

However, in various embodiments, the LNA chip 10 is controlled by the analog bus 110 from the switch chip 30. The switch chip 30 receives the control commands for the LNA and converts them into analog signal, which is then transmitted through the analog bus 110. Additionally, a simple digital bus 120, such as a general purpose input/output (GPIO) bus may be coupled between the LNA chip 10 and the switch chip 30.

Figure 2:
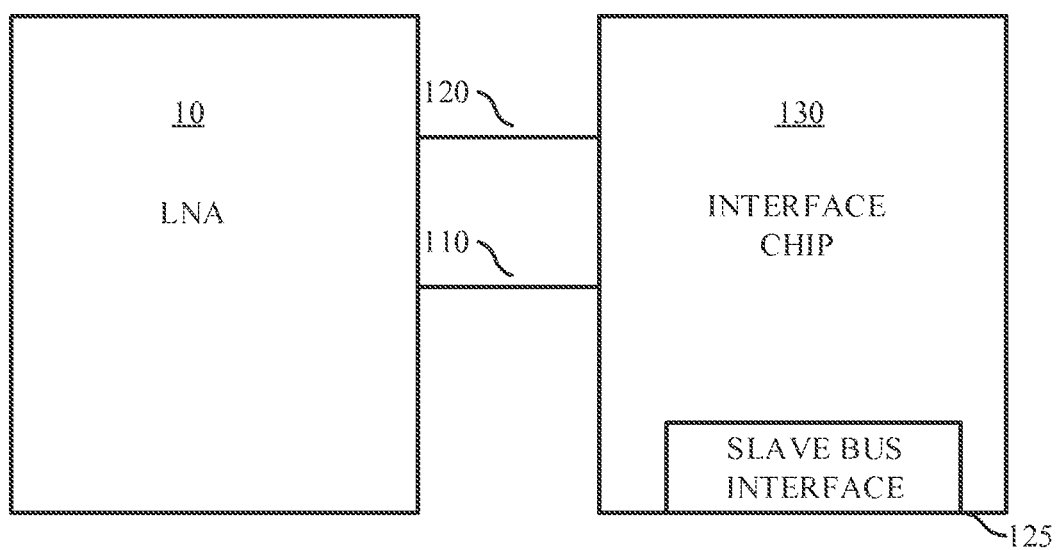
FIG. 2 illustrates a generic schematic of a chip set in accordance with embodiments of the present invention.

FIG. 2 illustrates a generic schematic of a chip set in accordance with embodiments of the present invention.

The chip set illustrated in FIG. 2 includes a LNA chip 10 and an interface chip 130 coupled together by an analog bus. The interface chip 130 includes a slave bus interface such as a RFFE slave bus interface for receiving control signals from a master bus interface. The interface chip 130 receives control information for the LNA chip 10 at the slave bus interface and converts them into analog and/or digital signals that are then transferred to the LNA chip 10 through an analog bus 110 and a digital bus 120.

In conventional methods, the slave bus interface has to be implemented in the LNA chip 10. However, the MIPI interface is difficult and expensive to implement in SiGe and GaAs technologies where almost everything is different than silicon technology. For example, a significant chip area is necessary to decode the control information. Another disadvantage is the high power consumption of such logic blocks in SiGe technologies. This difficulty results in a limit which can be justified as effort, for example, current consumption and area consumption. In contrast, using the embodiments of the invention, this function is separated into two chips, which reduces the costs significantly.

Figure 3A:
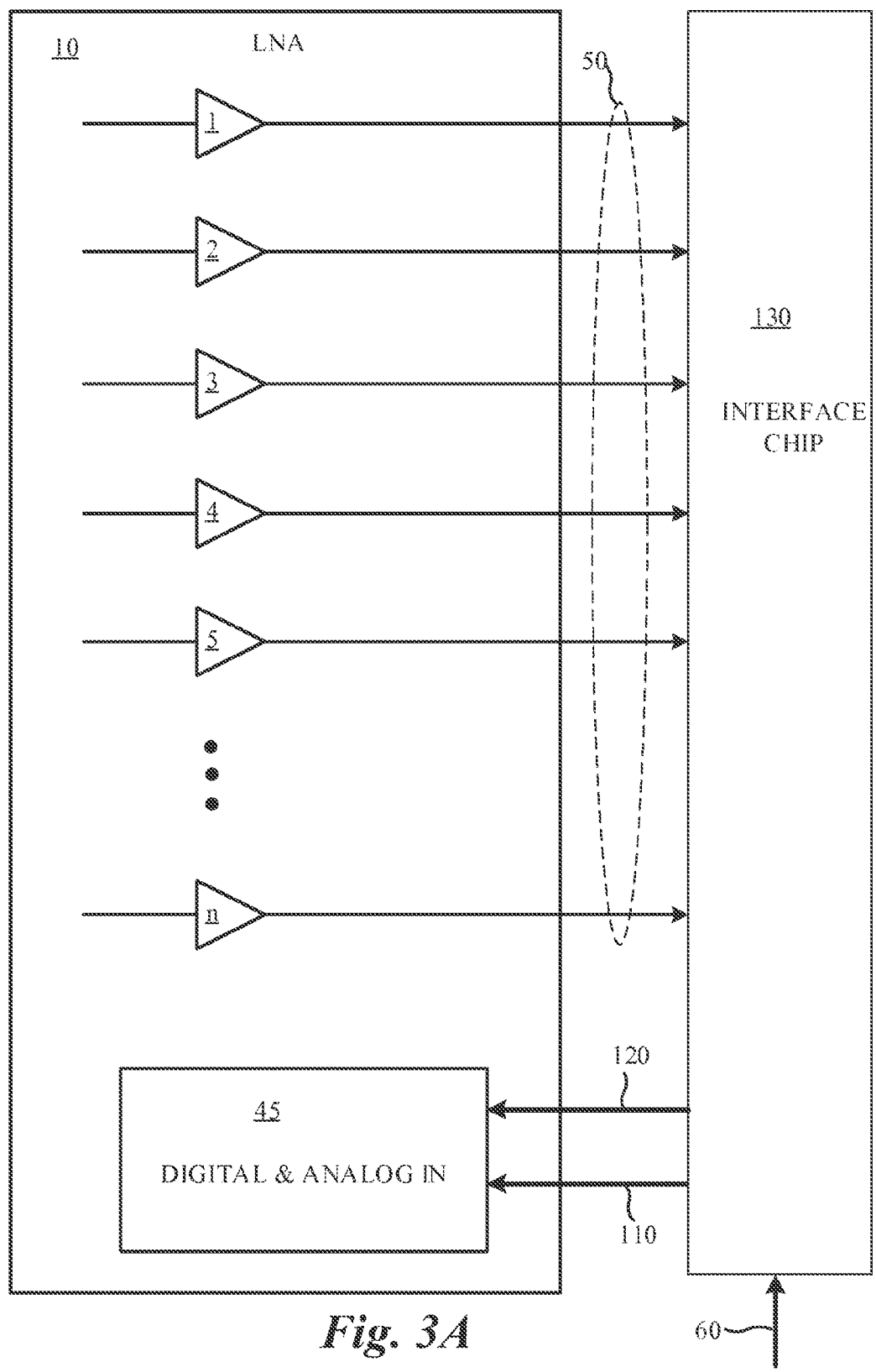
FIGS. 3A and 3B, illustrates a schematic of the LNA chip coupled to an interface chip in accordance with embodiments of the present invention.
Figure 3B:
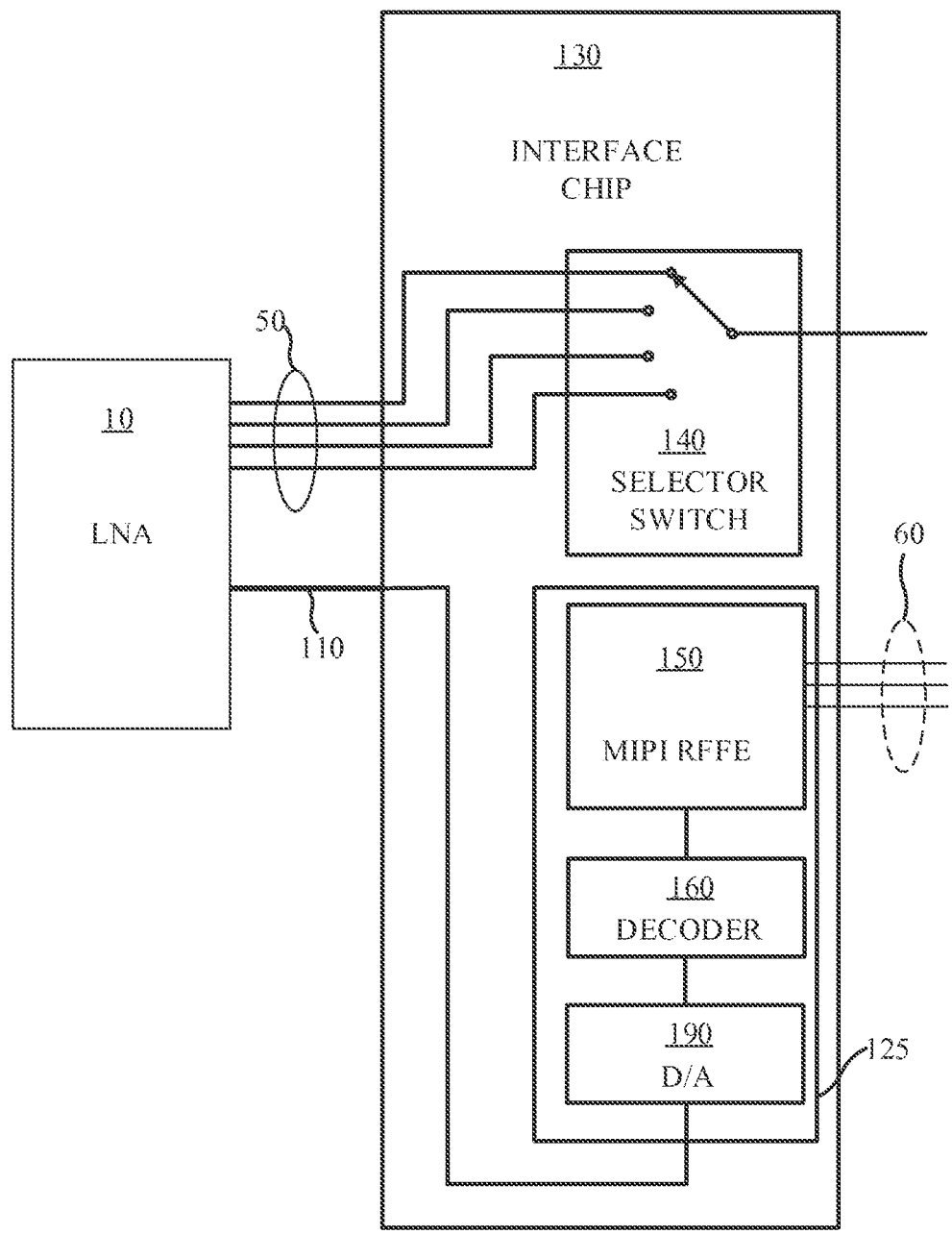

FIG. 3, which includes FIGS. 3A and 3B, illustrates a schematic of the LNA chip coupled to an interface chip in accordance with embodiments of the present invention.

Referring to FIG. 3A, the LNA chip 10 includes one or more low noise amplifiers 1-n. For example, each receive path is amplified by a particular LNA of the one or more low noise amplifiers 1-n.

In various embodiments, the interface chip 130 may be any circuit in the system. For example, in some embodiments, the interface chip 130 may be located in the outgoing path of the LNA chip 10. In an alternative embodiment, the interface chip 130 may be located in the input path of the LNA chip 10. For example, in FIG. 1, the interface chip 130 is integrated with a switch in the input path of the LNA chip 10. The interface chip 130 receives control signals on the bus 60. As described above, the bus 60 may be compliant with a MIPI protocol in various embodiments.

The LNA chip 10 may also include a digital and analog input circuit 45 for receiving the analog and digital signals from the interface circuit 130. For example, the digital and analog input circuit 45 may receive current or voltage levels on the analog bus 110 and transfer it to the corresponding LNA. Similarly, the digital and analog input circuit 45 may receive a digital signal on the digital bus 120. For example, the interface circuit 130 may generate a digital signal on a particular line of the digital bus 120 indicating the activation of a particular LNA in the LNA chip 10.

FIG. 3B illustrates a schematic of the interface chip 130 coupled to the LNA chip in accordance with embodiments of the present invention.

Referring to FIG. 3B, the interface chip 130 includes a slave bus interface 125 in communication with the master bus interface on the RFIC 40. In various embodiments, the slave bus interface 125 includes sufficient digital logic to receive and decode the control information received at the bus 60.

The slave bus interface 125 includes a MIPI RFFE 150 to receive the control signals, a decoder 160 to decode the signals, and a digital to analog converter (DAC) 190 to convert the decoded signals to analog signals. The slave bus interface 125 for the LNA chip 10 is identified by a slave identifier (USID), manufacturer ID, and product ID. For example, the manufacturer ID is defined by the MIPI Alliance and the product ID is defined by the manufacturer. The output from the DAC 190 is a voltage or current, which is transmitted to the LNA chip 10 through an analog bus 110. The master interface bus at the RFIC 40 may be programmed to identify and associate the LNA chip 10 by the slave identifier (USID) on the interface chip 130.

RFFE uses two signal lines, a clock signal (SCLK) controlled by the master, a unidirectional/bidirectional data signal (SDATA), and an I/O supply/reference voltage (VIO). Each physical slave bus interface 125 includes one SCLK input pin, one SDATA input or bidirectional pin, and a VIO pin to ensure signal compatibility between devices.

RFFE defines a variety of command sequences to accomplish read and write accesses to slave devices on the bus, with the primary differences being the amount of addressable space available, and the size of payload data which may be transferred within a single command sequence.

Accordingly, complex control information, for example, compliant with the MIPI RFFE control interface may be received at the MIPI RFEE 150 using three control lines at the bus 60. This control information may be, for example, a 3-bit word setting the current consumption of the respective LNAs in the LNA chip 10 which are currently in operation. The 3-bit word is then converted to an analog current (e.g., between 0-50 µA) which is then sent to the LNA chip 10 on a single control line instead of three control lines. The simpler output from the interface chip 130 may be received at the LNA chip 10. The analog current is then mirrored inside the LNA chip to get the respective current consumption for each LNA.

In another example, the complex control information may be, for example, a 3-bit word setting the gain level of the respective LNAs which are currently in operation. The 3-bit word may be converted to an analog voltage (e.g., between 0-800 mV), which is then transmitted to the LNA chip 10 on a single control line instead of the three control lines. The simpler output from the interface chip 130 may be received at the LNA chip 10. The analog voltage is then used to generate the respective biasing inside the LNA chip 10 to get the respective gain for each LNA.

In yet another example, control information regarding the activation or deactivation of a particular LNA may be received at the MIPI RFEE 150 through the bus 60. The slave bus interface 125 converts this information into a single digital signal that may be transmitted on a simple digital bus to a GPIO pin of the LNA chip 10.

If the interface chip 130 is integrated onto a switch circuit, then the interface chip 130 may also include a selector switch 140 through which the signal lines of the LNA chip 10 pass.

Figure 4:
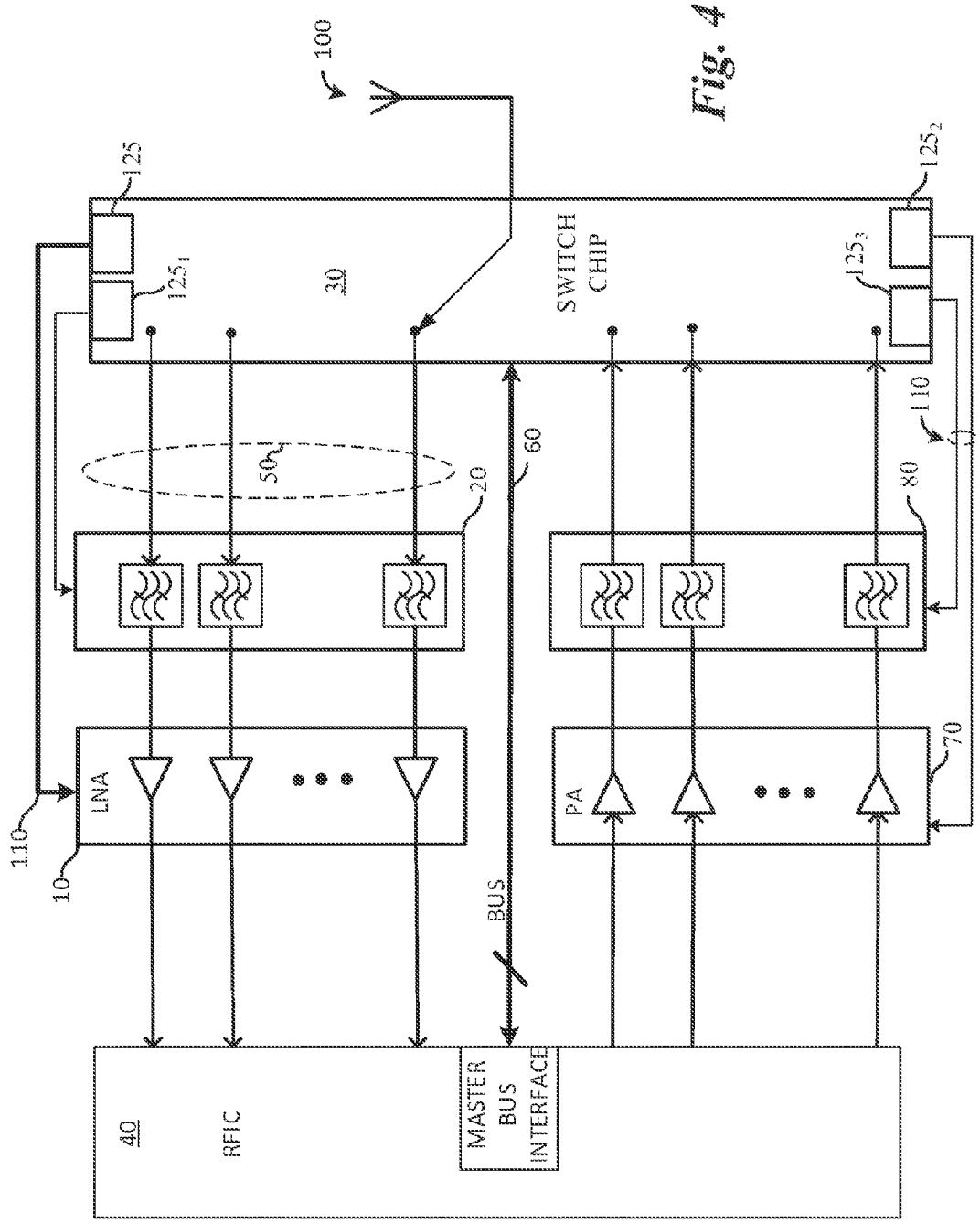
FIG. 4 illustrates a schematic block diagram of a mobile handset chipset in accordance with an alternative embodiment of the present invention.

FIG. 4 illustrates a schematic block diagram of a mobile handset chipset in accordance with an alternative embodiment of the present invention.

As an illustration, in this embodiment, more than one slave bus interface may be integrated into the switch chip 30. In various embodiments, multiple slave devices may have their slave bus interface designed into the switch chip 30 or other chip formed on bulk digital technology. For example, the switch chip 30 comprises a slave bus interface 125 coupled to the LNA chip 10 as described previously. However, the switch chip 30 further comprises additional slave bus interface circuits $125_1$, $125_2$, $125_3$ for other components such as the RX filter bank 20, the PA chip 70, and the TX filter bank 80. As described previously, an analog bus 110 is used to transfer control information from the corresponding slave bus interface to the respective slave devices.

As in the prior embodiment, the master bus interface at the RFIC 40 provided control information to control the corresponding slave devices such as the RX filter bank 20, the PA chip 70, and the TX filter bank 80 through the additional slave bus interface circuits $125_1$, $125_2$, $125_3$. The master interface bus at the RFIC 40 may be programmed to identify and associate the RX filter bank 20, the PA chip 70, and the TX filter bank 80 by the slave identifier (USID) on the interface chip 130 for each of the additional slave bus interface circuits $125_1$, $125_2$, $125_3$.

Figure 5:
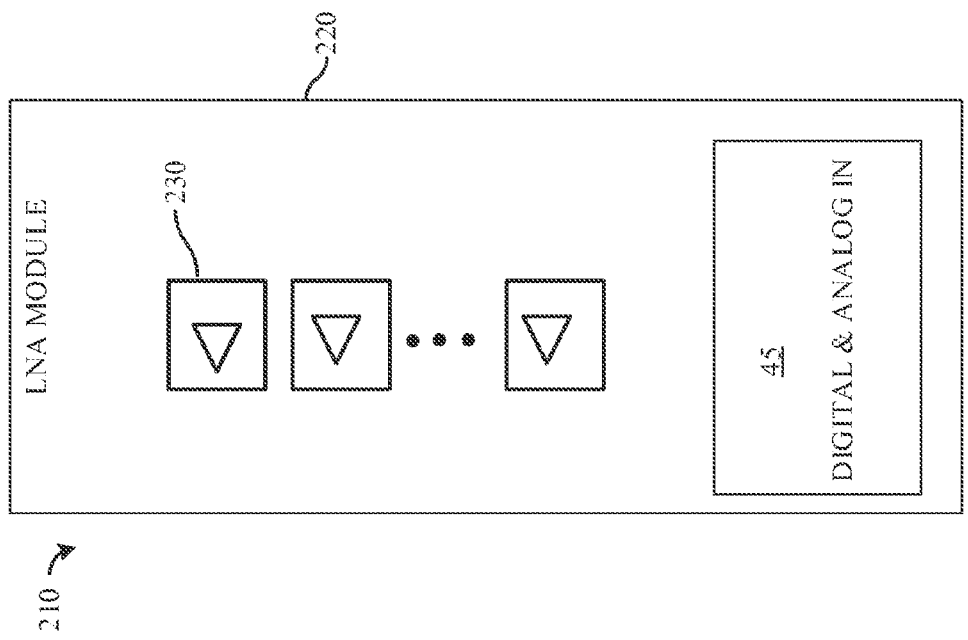
FIG. 5 illustrates a slave device in accordance with an embodiment of the present invention.

FIG. 5 illustrates a slave device in accordance with an embodiment of the present invention.

In some embodiments, the slave device may be formed as a LNA module 210 comprising separate chips. Each of the one or more LNAs may be formed on separate substrates as a LNA die 230, which may be packaged as a single unit. For example, individual LNA dies 230 may be interconnected through a LNA board 220. Alternatively, the LNA dies 230 may be stacked and interconnected through package level interconnects such as through vias, bond wires, clips, solder balls, redistribution lines, and others. In some embodiments, a separate die may be used as a digital and analog input 45, which may also be packaged on the LNA board 220.

Figure 6B:
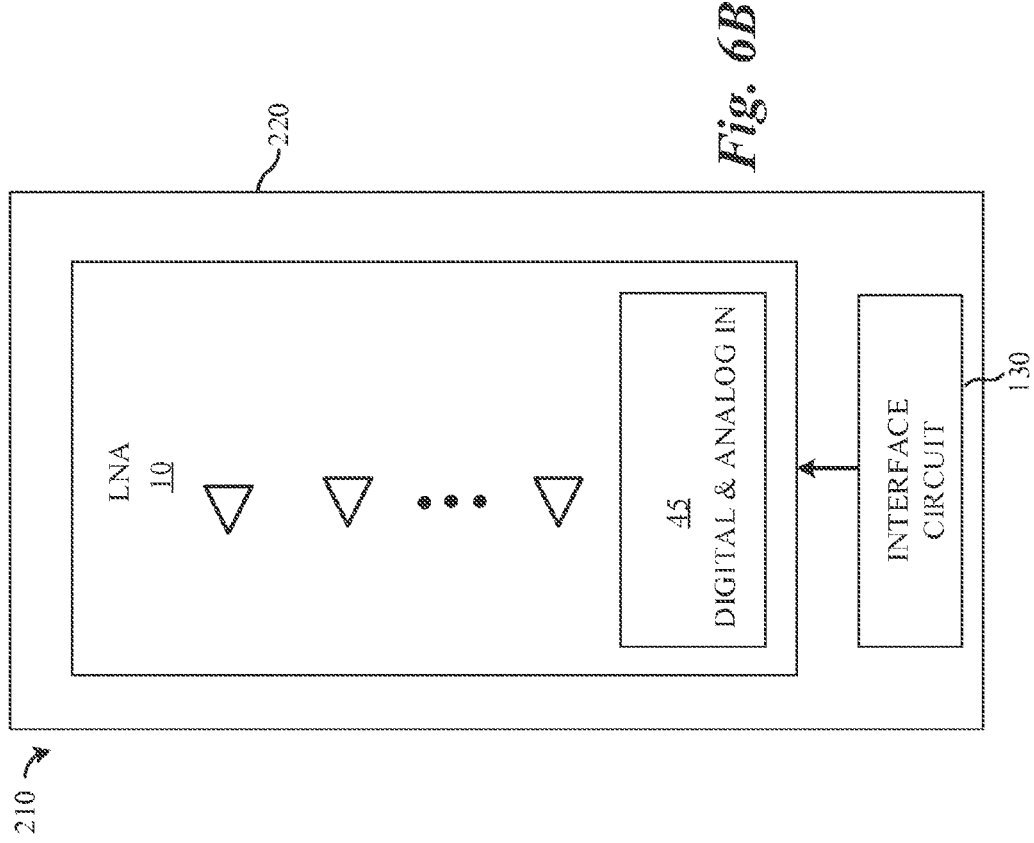
FIGS. 6A and 6B, illustrates a schematic block diagram of a mobile handset chipset in accordance with an alternative embodiment of the present invention.
Figure 6A:
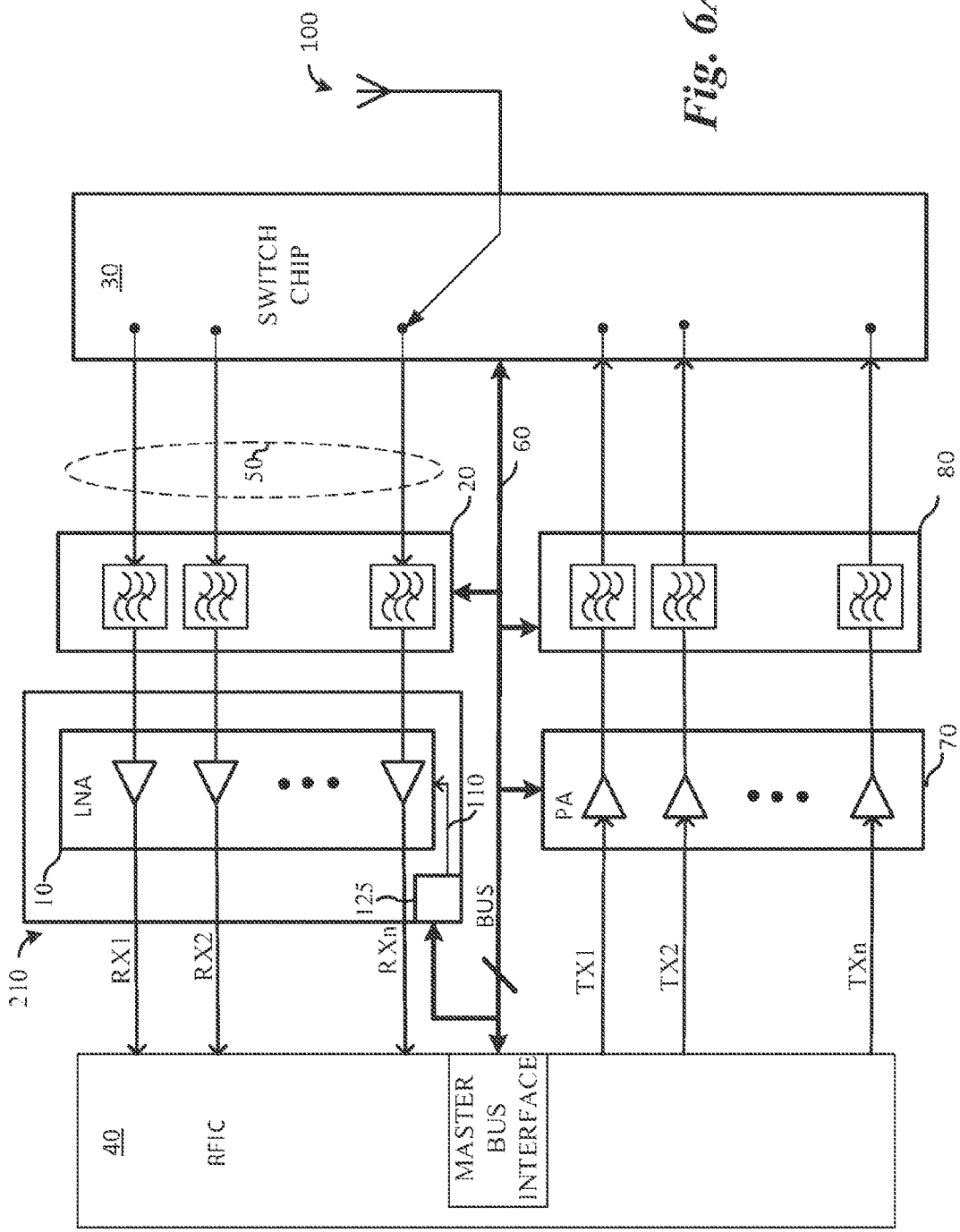

FIG. 6, which includes FIGS. 6A and 6B, illustrates a schematic block diagram of a mobile handset chipset in accordance with an alternative embodiment of the present invention. FIG. 6A illustrates an embodiment of the mobile handset chipset while FIG. 6B illustrates a chip set.

In this embodiment, a LNA module 210 or chipset may be formed to include both the LNA chip 10, for example, as described in FIG. 3A, and the interface circuit 130 comprising the slave bus interface, for example, as described in FIG. 3B. In this embodiment, an analog bus between the LNA chip 10 and the interface circuit 130 is formed within the LNA module 210.

Figure 7B:
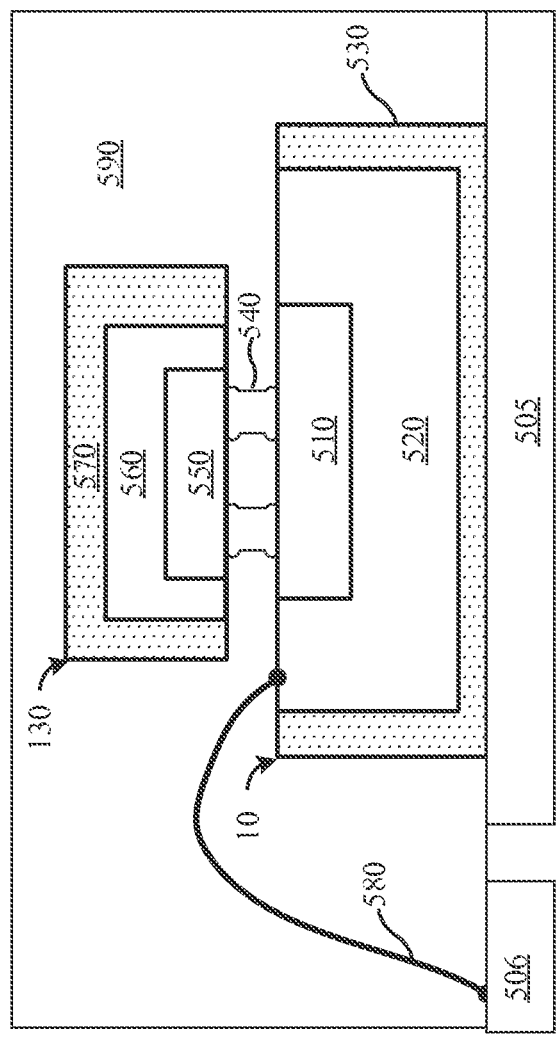

FIG. 7, which includes FIGS. 7A and 7B, illustrates a structural embodiment of the LNA chipset used for mobile handset chipset in accordance with an embodiment of the present invention.

Referring to FIG. 7A, the chipset includes a LNA chip 10 and an interface chip 130 comprising a slave bus interface, for example, which may be integrated into a switch chip 30, coupled together through a board 500. As described previously, the interface chip 130 may be incorporated as part of another chip, for example, a switching chip. In various embodiments, the board 500 may include interconnects for connecting the LNA chip 10 with the interface chip 130, for example, through an analog bus 110 and a simple digital bus 120, which may be formed within the board 500.

As illustrated in FIG. 7A, the LNA chip 10 comprises a first semiconductor substrate 520 comprising LNA devices 510. In various embodiments, the LNA devices 510 are formed using SiGe or GaAs technology. In one or more embodiments, the LNA devices 510 comprise one or more heterojunction bipolar transistors or a plurality of heterojunction bipolar transistors. For example, in SiGe technology, LNA devices 510 may comprise one or more SiGe heterojunction bipolar transistors or a plurality of heterojunction bipolar transistors. The first semiconductor substrate 520 may be encapsulated using a first encapsulant 530.

In contrast, the interface chip 130 comprises a second semiconductor substrate 560 comprising device regions 550 formed using field effect transistors using silicon technology. In one embodiment, the second semiconductor substrate 560 is a bulk silicon substrate and the device regions 550 comprise CMOS transistors. The second semiconductor substrate 560 may be encapsulated using a second encapsulant 570.

FIG. 7B illustrates an alternative embodiment of a package in package comprising a LNA chip and an interface chip.

In another embodiment, the LNA chip 10 and the interface chip 130 may be packaged together within a single package such as a lead frame package or other leadless packages. As described previously, the interface chip 130 may be incorporated as part of another chip, for example, a switching chip. As an illustration, the LNA chip 10 may be mounted over a die paddle 505, and an interface chip 130 may be mounted over the LNA chip 10 (or vice versa). FIG. 7B shows LNA chip 10 and the interface chip 130 as being packages only for illustration. The LNA chip 10 and the interface chip 130 may be packages or may be unpackaged semiconductor dies in various embodiments. Interconnects 580, which may be wire bonds, clips, redistribution lines may be used to interconnect the LNA chip 10 and the interface chip 130 and also with one or more leads of a plurality of leads 506. The LNA chip 10 and the interface chip 130 may also be directly coupled to each other using connections 540, which may be solder balls, interposers, through vias, and others.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A chip set for a mobile device comprising:
   a slave device chip comprising a circuit and an analog input circuit, the slave device chip configured to control the circuit based on an analog signal received at the analog input circuit; and
   an interface circuit chip comprising a slave bus interface, the slave bus interface comprising
      an analog bus interface circuit coupled to the analog input circuit of the slave device chip via an analog bus using only analog signals, and
      a digital bus interface circuit coupled to the analog bus interface circuit, and configured to be coupled to a master bus interface via a digital bus of the mobile device, wherein the digital bus interface circuit is configured to convert a first command received from the digital bus to a first analog command, the analog bus interface circuit is configured to transmit the first analog command to the slave device chip via the analog bus, the slave device chip is formed on a first substrate implemented in a first semiconductor technology, and the interface circuit chip is formed on a second substrate implemented in a second semiconductor technology different from the first semiconductor technology.

2. The chip set of claim 1, wherein the slave device chip is an analog chip, and the circuit comprises analog circuitry.

3. The chip set of claim 2, wherein the analog circuitry comprises one or more heterojunction bipolar transistors.

4. The chip set of claim 1, wherein the interface circuit chip comprises one or more silicon field effect transistors, wherein the slave device chip is an analog chip comprising SiGe or GaAs devices.

5. The chip set of claim 1, wherein the slave device chip is a low noise amplifier chip, a power amplifier chip, a filter chip, an antenna tuner chip, a sensor chip, or a DC/DC converter chip.

6. The chip set of claim 1, wherein the slave device chip comprises one or more low noise amplifiers.

7. The chip set of claim 1, wherein the slave bus interface is configured to communicate with the master bus interface using a MIPI RF Front-End (RFFE) Control Interface protocol.

8. The chip set of claim 1, wherein the first substrate comprises transistors having regions comprising SiGe or GaAs, and wherein the second substrate is a silicon substrate comprising complementary metal oxide semiconductor (CMOS) logic gates.

9. The chip set of claim 1, wherein the slave device chip comprises one or more low noise amplifiers formed on the first substrate, and wherein the interface circuit chip is configured to implement a MIPI RF Front-End (RFFE) Control Interface for the slave device chip on the second substrate.

10. The chip set of claim 9, wherein the interface circuit chip is coupled to each of the one or more low noise amplifiers through the analog bus.

11. The chip set of claim 9, wherein the slave device chip is further coupled to the interface circuit chip through a GPIO interface bus.

12. The chip set of claim 1, wherein:
the analog bus interface circuit comprises a digital-to-analog converter; and
the digital bus interface circuit comprises a MIPI RF Front-End (RFFE) interface circuit.

13. An interface circuit chip for a mobile device comprising:
a slave bus interface for controlling a slave device chip;
a digital input coupled to the slave bus interface, the digital input configured to be coupled to a master bus interface via a digital bus of the mobile device, the digital bus coupling the slave bus interface to the master bus interface; and
an analog output coupled to the slave bus interface, the analog output configured to be coupled to the slave device chip through an analog bus configured to transfer only analog signals, the analog bus coupling the slave device chip to the slave bus interface, wherein the slave bus interface is configured to convert a digital control signal for controlling the slave device chip received at the digital input to an analog signal at the analog output.

14. The interface circuit chip of claim 13, wherein the slave bus interface is a MIPI RF Front-End (RFFE) Control Interface.

15. The interface circuit chip of claim 13, wherein the slave device chip comprises one or more low noise amplifiers (LNAs), and wherein the digital control signal comprises gain or current consumption of an LNA of the one or more low noise amplifiers.

16. The interface circuit chip of claim 13, wherein the interface circuit chip comprises one or more silicon field effect transistors, wherein the slave device chip comprises one or more heterojunction bipolar transistors.

17. The interface circuit chip of claim 13, wherein the digital control signal is a 3-bit word compliant with MIPI RF Front-End (RFFE) Control Interface protocol.

18. The interface circuit chip of claim 13, wherein the slave device chip is a low noise amplifier chip, a power amplifier chip, a filter chip, an antenna tuner chip, a sensor chip, or a DC/DC converter chip.

19. The interface circuit chip of claim 13, wherein the interface circuit chip comprises a switch configured to be in a signal path of the slave device chip.

20. A method of controlling a slave device chip in a mobile device, the method comprising:
receiving a control signal intended for the slave device chip on a digital bus at an interface circuit chip, the interface circuit chip being different from the slave device chip, the control signal being a digital signal;
converting, by performing a digital to analog conversion, the control signal to an analog signal comprising control information at the interface circuit chip;
transmitting the analog signal comprising the control information to the slave device chip through an analog bus different from the digital bus; and
transmitting signals received from an antenna to the interface circuit chip through a data connection path different from the analog bus and the digital bus.

21. The method of claim 20, wherein the slave device chip is an amplifier chip comprising analog circuitry.

22. The method of claim 20, wherein the slave device chip comprises one or more low noise amplifiers (LNAs), and wherein the control information comprises gain or current consumption of an LNA of the one or more low noise amplifiers.

23. The method of claim 20, wherein the interface circuit chip comprises silicon field effect transistors, wherein the slave device chip comprises heterojunction bipolar transistors.

24. The method of claim 20, wherein the control signal is a 3-bit word compliant with MIPI RF Front-End (RFFE) Control Interface protocol.

25. The method of claim 20, wherein the slave device chip is a power amplifier chip, a low noise amplifier chip, a filter chip, an antenna tuner chip, a sensor chip, or a DC/DC converter chip.

26. The method of claim 20, wherein the interface circuit chip comprises a switch in a signal path of the slave device chip.

27. The method of claim 20, wherein the interface circuit chip comprises silicon technology based silicon field effect transistors, wherein the slave device chip comprises SiGe or GaAs technology based SiGe or GaAs heterojunction bipolar transistors.

28. A chip set comprising:
a GaAs based analog chip comprising GaAs transistors; and
a silicon technology based interface circuit chip, the interface circuit chip comprising a slave bus interface for controlling the analog chip through an analog bus, the analog bus configured to transfer only analog signals, the analog bus coupling the analog chip to the slave bus interface, the slave bus interface coupled to a master bus interface via a digital bus, the digital bus coupling the slave bus interface to the master bus interface, the slave bus interface configured to be driven by the master bus interface; and
a filter bank coupled between the interface circuit chip and the analog chip.

* * * * *